United States Patent
Kern

[11] Patent Number: 6,144,168
[45] Date of Patent: Nov. 7, 2000

[54] CIRCUIT ARRANGEMENT FOR OPERATION OF A HIGH-PRESSURE GAS DISCHARGE LAMP ON ALTERNATING CURRENT

[75] Inventor: Robert Kern, Sasbachwalden, Germany

[73] Assignee: Robert Bosch GmbH, Stuttgart, Germany

[21] Appl. No.: 09/011,743

[22] PCT Filed: Apr. 16, 1996

[86] PCT No.: PCT/DE96/00655

§ 371 Date: May 22, 1998

§ 102(e) Date: May 22, 1998

[87] PCT Pub. No.: WO97/08923

PCT Pub. Date: Mar. 6, 1997

[30] Foreign Application Priority Data

Aug. 22, 1995 [DE] Germany .......................... 195 30 746

[51] Int. Cl.[7] .................................................. H05B 37/02
[52] U.S. Cl. ..................... 315/219; 315/209 R; 315/276; 315/DIG. 7
[58] Field of Search ................................... 315/354, 355, 315/356, 209 R, 219, 276, DIG. 7, DIG. 5, 291, 307, 224

[56] References Cited

U.S. PATENT DOCUMENTS

| | | | |
|---|---|---|---|
| 3,699,382 | 10/1972 | Franke | 315/92 |
| 3,772,565 | 11/1973 | Lenz et al. | 315/276 |
| 4,950,961 | 8/1990 | Zaslavsky et al. | 315/289 |
| 4,958,107 | 9/1990 | Mattas et al. | 315/289 |
| 4,999,546 | 3/1991 | Koda et al. | 315/225 |
| 5,144,204 | 9/1992 | Nerone et al. | 315/209 R |
| 5,149,995 | 9/1992 | Hofgraff | 307/633 |
| 5,434,768 | 7/1995 | Jitaru et al. | 363/21 |
| 5,497,052 | 3/1996 | Buckley et al. | 315/276 |
| 5,729,444 | 3/1998 | Perol | 363/25 |

FOREIGN PATENT DOCUMENTS

| | | |
|---|---|---|
| 2204751 | 4/1987 | European Pat. Off. . |
| 0 240 049 | 10/1987 | European Pat. Off. . |
| 2265506 | 3/1993 | European Pat. Off. . |
| 40 17 415 | 2/1991 | Germany . |
| 2 204 751 | 11/1988 | United Kingdom . |
| 2 265 506 | 9/1993 | United Kingdom . |
| 89/06085 | 6/1989 | WIPO . |

*Primary Examiner*—Don Wong
*Assistant Examiner*—Tuyet T. Vo
*Attorney, Agent, or Firm*—Kenyon & Kenyon

[57] ABSTRACT

A circuit arrangement for generating an a.c. voltage, in particular the operating voltage of a high-pressure gas discharge lamp in a motor vehicle headlight, includes a transformer with a primary winding and a secondary winding which are closely linked together. These two windings form an autotransformer. The primary winding is connected at one terminal to a d.c. voltage source. At its other terminal, the intermediate tap of the transformer, it is connected to the secondary winding and also to a controlled switch. The controlled switch connects the intermediate tap to the negative terminal of the d.c. voltage source. The second terminal of the secondary winding is connected across a capacitor to a high-pressure gas discharge lamp which forms the output load. Output a.c. voltage, i.e., the operating voltage, is applied across this load. The switch is damped by the series connection of a resistor and a capacitor.

10 Claims, 1 Drawing Sheet

CIRCUIT ARRANGEMENT FOR OPERATION OF A HIGH-PRESSURE GAS DISCHARGE LAMP ON ALTERNATING CURRENT

FIELD OF THE INVENTION

The present invention relates to a circuit arrangement for operation of a high-pressure gas discharge lamp with alternating current.

BACKGROUND INFORMATION

German Patent Application No. 40 17 415 and European Patent Application No. 240,049 describe circuit arrangements for starting and operating a.c. high-pressure gas discharge lamps, where the alternating current is obtained from a d.c. source. First, a stabilized and/or power-regulated d.c. voltage is generated from the d.c. voltage of the d.c. voltage source using a DC/DC transformer. Then the alternating current required for operation is generated from this with the help of a bridge circuit. Such an arrangement is expensive and also requires a larger amount of space.

In general, however, in this conventional circuit arrangement, the components used are, first, very numerous and, second, are very large themselves, because they must be designed for operation at low frequencies. This is in conflict in a deleterious manner with the least expensive possible design and operation of such a circuit operation for starting and operating a high-pressure gas discharge lamp.

The arrangements for operation of high-pressure gas discharge lamps in motor vehicles which are on the market operate according to two different principles. With the first principle, both starting and operation take place in the resonance range. The starting frequency, i.e., in starting the lamp, is approx. 80 kHz and the burning or operating frequency is approx. 8 to 16 kHz. According to the other principle, the lamp is operated in intermittent d.c. operation, i.e., the polarity of the direct current is reversed repeatedly. The polarity reversal frequency is approx. 400 Hz. The lamp is started by a separate pulse starter. The lamps are xenon lamps or metal halide lamps whose high pressure is approx. 80 bar. Considering the worst possible tolerance conditions, a high voltage of 24 kV is necessary to start the electric arc. In burning operation, the required voltage is approx. 85 V.

Theoretical disadvantages of these conventional principles are based on the fact that they require a relatively large number of components and a special starter, and furthermore the components are quite large and must be high-voltage resistant. With the arrangement which works according to resonance operation, a particular disadvantage is that it is necessary to work with very high currents in the primary winding because of the voltage source characteristic of the flow transformer. This leads to large components and a relatively poor efficiency. This results in the disadvantages of relatively high cost, high power losses and a considerable amount of space required.

SUMMARY OF THE INVENTION

A circuit arrangement according to the present invention has the advantage over the related art of direct generation of the operating alternating current with a single transformer. The present invention avoids high currents on the primary side. In addition, no bridge circuit is necessary. The present invention eliminates a large number of components and also has the advantage that the components themselves may have a simpler design. Ultimately, the present invention saves space and reduces costs.

According to the present invention, the a.c. operating voltage is obtained directly from the d.c. voltage of the d.c. power source using a transformer which is designed as an autotransformer, with the primary winding of the transformer connected to the d.c. power source, the intermediate tap of the transformer connected to a controlled switch, and the secondary winding of the transformer connected to the high-pressure gas discharge lamp across a capacitor.

According to an especially advantageous exemplary embodiment of the present invention, the primary and secondary windings of the transformer are designed so they are closely linked together.

In an expedient exemplary embodiment of the present invention, the transformation ratio between the secondary and primary windings of the transformer corresponds to the ratio between the a.c. operating voltage and the d.c. voltage of the d.c. power source.

In an expedient further development of the circuit arrangement according to present invention, the controlled switch is cycled, in particular at a frequency of 10 to 100 kHz. In an advantageous exemplary embodiment of the present invention, the controlled switch is a metal-oxide semiconductor field-effect transistor (MOSFET).

According to an advantageous further development of the present invention, the controlled switch is damped, in particular with the series connection of a resistor and a capacitor in parallel with the contact gap.

DETAILED DESCRIPTION OF THE INVENTION

Figure 1:
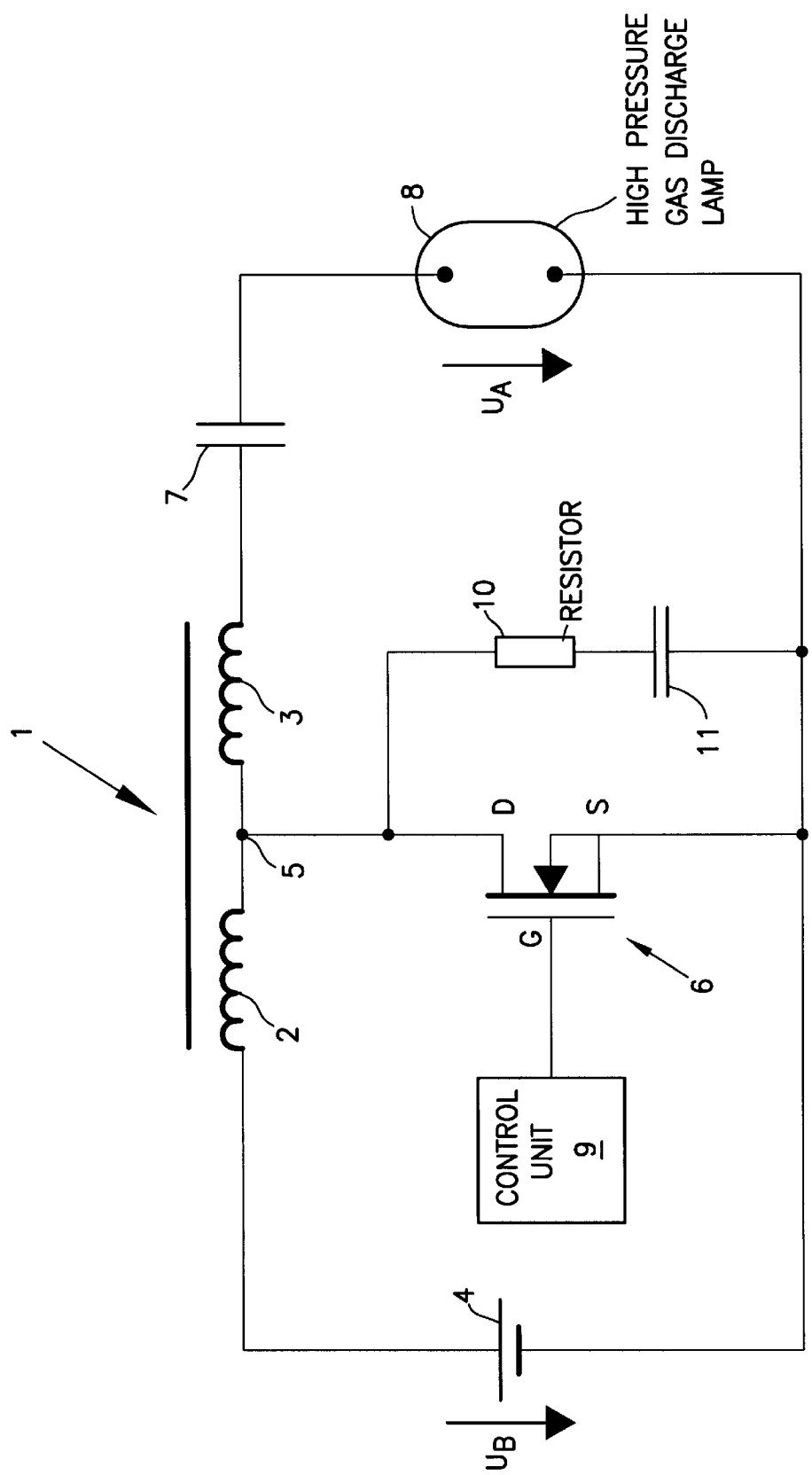
FIG. 1 shows a diagram of a circuit arrangement according to the present invention.

FIG. 1 shows a schematic block diagram of the circuit arrangement according to the present invention. This circuit arrangement for generating an a.c. voltage, in particular the operating voltage of a high-pressure gas discharge lamp of an automotive headlight contains transformer 1 with a primary winding 2 and a secondary winding 3, which are closely linked together. These two windings 2 and 3 form an autotransformer. Primary winding 2 is connected at one terminal to a d.c. voltage source 4. At its other terminal, intermediate tap 5 of transformer 1, it is connected to the first terminal of secondary winding 3 and also to a controlled switch 6. Controlled switch 6 connects intermediate tap 5 to the negative terminal of d.c. voltage source 4. The second terminal of secondary winding 3 is connected across a capacitor 7 to a high-pressure gas discharge lamp 8 forming the output load. Output a.c. voltage $U_A$, i.e., the operating voltage, is applied across this load. The diagram in FIG. 1 does not show a starter for high-pressure gas discharge lamp 8.

The transformation ratio between secondary winding 3 and primary winding 2 of transformer 1 is advantageously selected to reflect the ratio of operating voltage $U_A$ and d.c. voltage $U_B$ of d.c. voltage source 4. In the intended main application of the present invention, i.e. to provide the operating power of high-pressure gas discharge lamp 8 in an automotive headlamp, where d.c. voltage source 4 is the vehicle's battery and has a nominal value of 12 V, for example, and where operating voltage $U_A$ of the high-pressure gas discharge lamp is approx. 85 V, the transformation ratio may be between 4 and 8, taking into account all deviations.

After successful starting of high-pressure gas discharge lamp 8, controlled switch 6 is cycled in burning operation. In an advantageous exemplary embodiment of the present invention, switch 6 is a MOSFET. Drain D of switch 6 is connected to intermediate tap 5 of transformer 1 and source 5 is connected to the negative terminal of d.c. voltage source 4. The control pulses needed for cycling are applied to gate G by control circuit 9. In another advantageous exemplary embodiment of the present invention, switch 6 is damped to prevent emission of electromagnetic radiation. In the exemplary embodiment shown in FIG. 1 illustrated here with MOSFET 6, the series connection comprising a resistor 10 and a capacitor 11 is connected in parallel to the drain-source clearance of the transistor for this purpose. This damping with suitable dimensioning prevents the high-frequency cut-out oscillations occurring between the inductances of the two windings 2 and 3 and the output capacitance of switch 6 when switch 6 is switched off. This prevents the emission of interfering electromagnetic radiation.

The operation and performance of the circuit arrangement according to the present invention are as follows:

When switching on switch 6, which is cycled in burning operation, with the clock frequency being between 10 and 100 kHz, for example, a negative voltage appears at the output of transformer 1 in the "on" state. This negative voltage depends on voltage $U_B$ of d.c. voltage source 4 and the transformation ratio of transformer 1. In this period of time, transformer 1 has a voltage characteristic because it is a flow transformer.

When switch 6 is switched off, a free-wheeling voltage develops in the "off" state. This voltage depends on the voltage of capacitor 7, which has already been established on high-pressure gas discharge lamp 8 which forms the load impedance, and on the previous magnetization of primary winding 2. In this period of time, transformer 1 has a current characteristic, because it is an isolating transformer.

In the cycling of switch 6, a d.c. voltage develops across capacitor 7 so that high-pressure gas discharge lamp 8 receives only a pure a.c. voltage. This is the desired operating voltage $U_A$. The characteristic of the internal resistance of the circuit arrangement designed according to the present invention or of the converter so designed is thus neither a pure current characteristic nor a pure voltage characteristic. Thus, the serious disadvantages of the voltage characteristic are not manifested.

Due to the current characteristic of the circuit arrangement according to the present invention, more compact designs, higher efficiencies and a smaller number of components are achieved. This in turn results in much lower costs.

What is claimed is:

1. A circuit arrangement for providing an a.c. voltage to operate a high-pressure gas discharge lamp, comprising:

a transformer providing the a.c. voltage directly from a d.c. voltage of a d.c. voltage source, the transformer including a primary winding coupled to the d.c. voltage source, a secondary winding, and an intermediate tap;

a controlled switch directly connected to the intermediate tap of the transformer; and a capacitor, wherein the secondary winding of the transformer is directly connected to the high-pressure gas discharge lamp via the capacitor, and wherein the controlled switch is damped with a series connection including a resistor and a further capacitor, the resistor and the further capacitor being coupled in parallel with a contact gap of the controlled switch.

2. A circuit arrangement for providing an a.c. voltage to operate a high-pressure gas discharge lamp, comprising:

a transformer providing the a.c. voltage directly from a d.c. voltage of a d.c. voltage source, the transformer including a primary winding coupled to the d.c. voltage source, a secondary winding, and an intermediate tap;

a dampening arrangement;

a controlled switch directly connected to the intermediate tap of the transformer, wherein the controlled switch is damped by the dampening arrangement; and a capacitor having a first end and a second end, wherein the secondary winding of the transformer is directly connected to the first end of the capacitor, and wherein the high-pressure gas discharge lamp is directly connected to the second end of the capacitor.

3. The circuit arrangement according to claim 2, wherein the high-pressure gas discharge lamp is in a motor vehicle headlight.

4. The circuit arrangement according to claim 2, wherein the transformer is an autotransformer.

5. The circuit arrangement according to claim 2, wherein the primary winding of the transformer and the secondary winding of the transformer are closely coupled together.

6. The circuit arrangement according to claim 2, wherein a first ratio corresponds to a second ratio, and wherein the first ratio is a function of a comparison of the secondary winding of the transformer to the primary winding of the transformer and the second ratio is a function of a comparison of the a.c. voltage to the d.c. voltage.

7. The circuit arrangement according to claim 2, wherein the controlled switch is a metal-oxide semiconductor field-effect transistor.

8. The circuit arrangement according to claim 2, wherein the dampening arrangement is coupled to the controlled switch.

9. The circuit arrangement according to claim 2, wherein the controlled switch is cycled.

10. The circuit arrangement according to claim 9, wherein the controlled switch is cycled between 10 kHz and 100 kHz.

* * * * *